Nov. 12, 1968

P. C. WATSON 3,410,976

SHAFT ANGLE ENCODER WITH PHASE DETECTION

Filed June 9, 1965

INVENTOR.
Paul C. Watson
BY
Morse, Altman & Oates
ATTORNEYS

Nov. 12, 1968   P. C. WATSON   3,410,976
SHAFT ANGLE ENCODER WITH PHASE DETECTION
Filed June 9, 1965   2 Sheets-Sheet 2
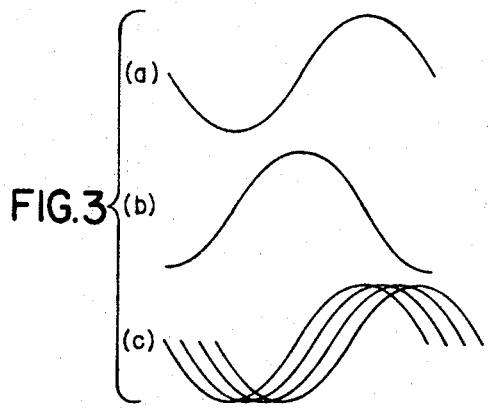
FIG. 3 (a) (b) (c)
FIG. 2
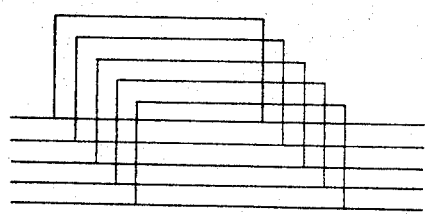
FIG. 4
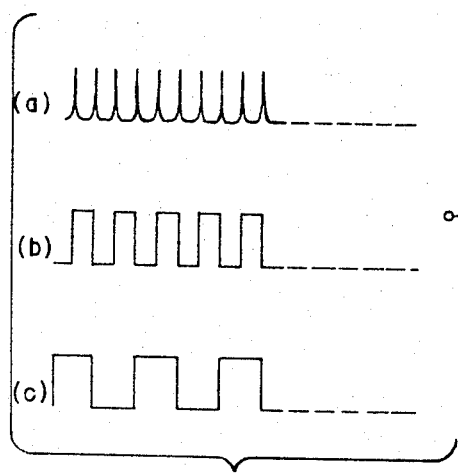
FIG. 5 (a) (b) (c)
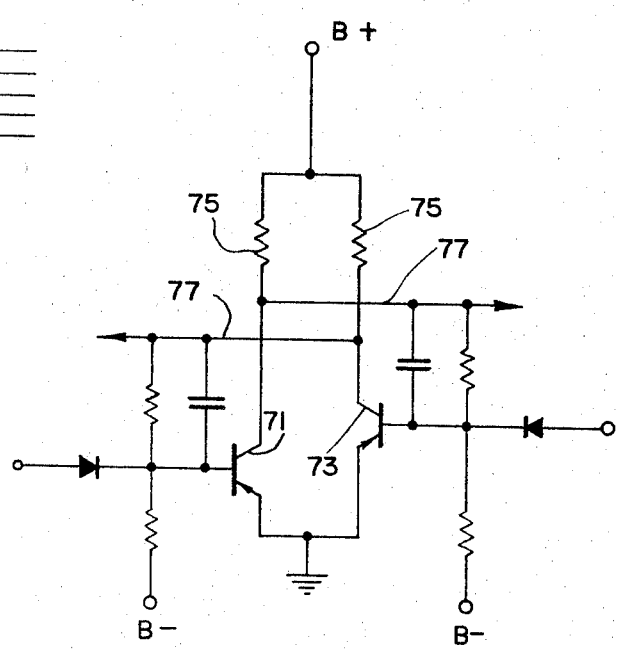
FIG. 6
INVENTOR.
Paul C. Watson
BY Morse, Altman & Oates
ATTORNEYS

United States Patent Office

3,410,976
Patented Nov. 12, 1968

3,410,976
SHAFT ANGLE ENCODER WITH
PHASE DETECTION
Paul C. Watson, Arlington, Mass., assignor, by mesne
assignments, to Itek Corporation, Lexington, Mass., a
corporation of Delaware
Filed June 9, 1965, Ser. No. 462,681
11 Claims. (Cl. 250—231)

ABSTRACT OF THE DISCLOSURE

An optical shaft angle encoder having an outer track of alternating opaque and transparent areas sensed by a pair of photocells which are arranged relative to the track such that the signals from the photosensors are phase shifted by 90°. These signals are summed in a weighted resistive network to produce a number of phase displaced output signals. The phase displaced signals are selectively applied to a detector which detects a sign change in the signals indicative of a zero crossover and representative of the position of the encoder disc relative to the sensor. The commutator includes a binary ring counter, matrix, and a plurality of gates to which the signals are applied. When the zero crossover is detected, the binary counter is read out.

---

The present invention relates to shaft angle encoding by which digital information is generated as a function of angular position and, more particularly, to the determination of extremely precise information in regard to shaft angularity by a so-called direct reading encoder.

In a typical direct reading encoder, angular position is determined in conjunction with a coded component (e.g. a disk) that is provided about its periphery with a series of concentric tracks, each having alternate increments (e.g. opaque and clear), which alternately actuate (e.g. direct radiation toward and obscure radiation from) a bank of suitable sensing components (e.g. photoelectric transducers). Reading, in effect, involves sensing a selected grouping of coded components that extend from track to track (e.g. along a stationary radial line relative to the rotatable disk). One limitation to angular resolution is the width of the increments along a particular code track, in other words, total number of increments physically specified (as by light available and structural limitations) in the code track. However, greater resolution than is so specified may be desired.

The output signal from such a sensing component generally is sinusoidally variable as a function of angular displacement in such an encoder. It has been proposed that a sensing assembly of at least two such sensing components be provided at different angular positions, with respect to at least one code track, in order to produce an association of at least two wave forms, displaced in phase, which in combination produce a sequence of wave forms, displaced in phase, representing subdivisions of the smallest increments of the code tracks. The present invention contemplates, for analyzing such a sequence of wave forms, a simplified system having a reduced number of components comprising a switching circuit for presenting the sequence of wave forms in sequence for analysis, a detecting circuit for determining where in the sequence crossover from one polarity to the other first occurs and a counting circuit indicating the number of wave forms detected to the occurrence of crossover as a representation of angular position; and to provide particular components in such a system for advantageously performing the switching, detecting and counting functions. It will become obvious that the invention is not limited to the configuration of the encoder disclosed hereinafter, for example, the resolution of a linear encoder (which may be thought of as a circular code track with an infinite radius) is also limited in resolution by the state-of-the-art in producing coded elements and the length available for placement of the code track. Thus, the principals and structure of the present invention are equally applicable to a linear configuration. Further, although an optical encoder is disclosed hereinafter as the preferred embodiment, it is obvious to a skilled artisan that the invention lies not only in the use of the specific type of transducer, i.e., a photocell, but the invention lies in the combination and is equally applicable to any type of encoder of this nature such as one having a conductive code track and a sensing scheme employing a plurality of brushes, an encoder having a capacitive relationship between the code track and the transducers, etc.

Other objects of the present invention will in part be obvious and will in part appear hereinafter.

For a fuller understanding of the nature and objects of the present invention, reference should be had to the following detailed description, taken in connection with the accompanying drawings, wherein:

FIG. 2 is a perspective view of certain details of the system of FIG. 1;

FIGS. 3, 4 and 5 illustrate graphically certain principles of the present invention; and FIG. 6 is a schematic diagram of an electrical component of the system of FIG. 1.

Figure 1:
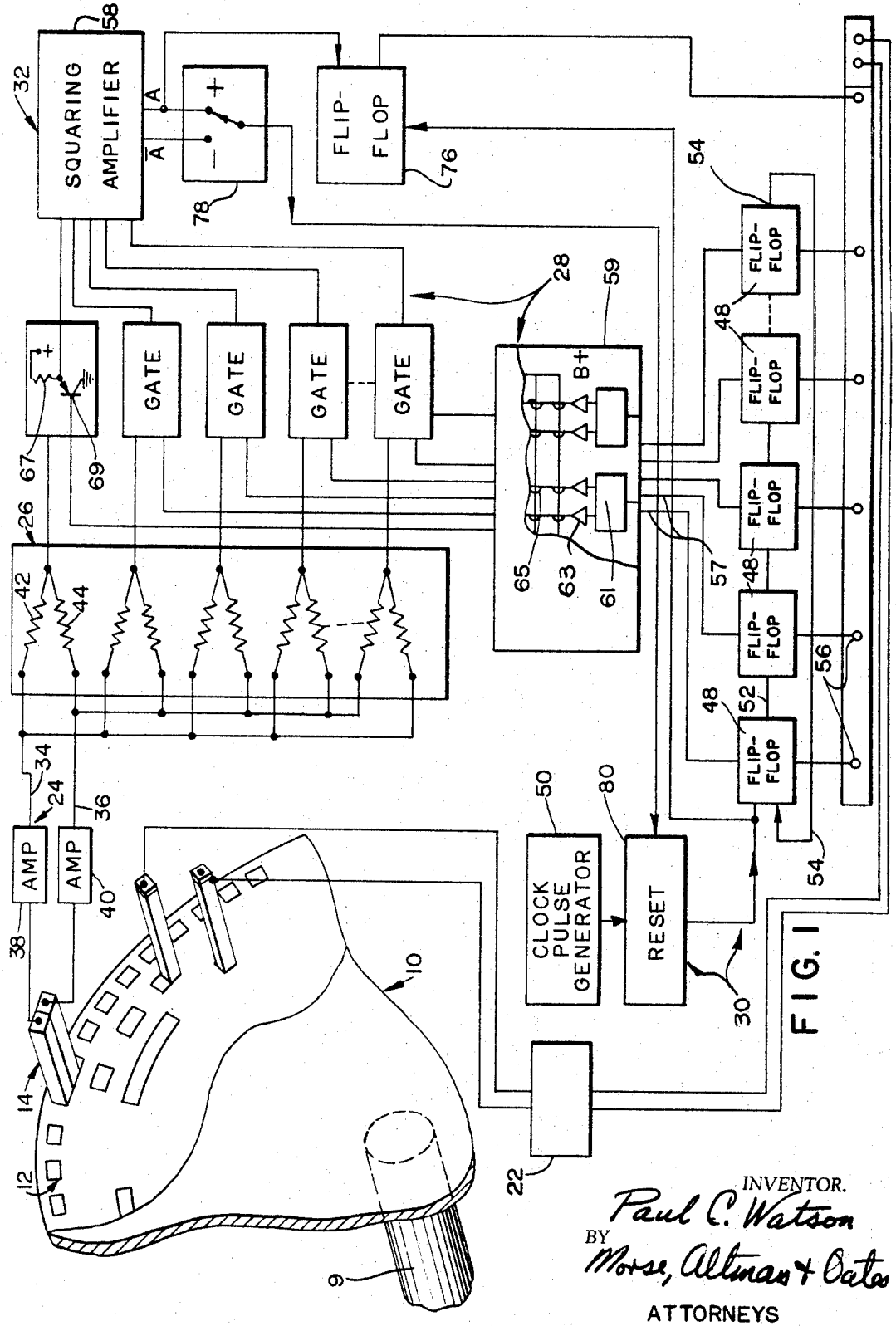
FIG. 1 is a diagrammatic view, partly in mechanical perspective and partly in electrical schematic, of a shaft angle encoding system embodying the present invention.

The illustrated embodiment of the present invention comprises, as an indicator for association with the output shaft 9 of an instrument or the like, a disk 10 presenting a plurality of concentric code tracks 12 of alternate apaque and clear increments, particular arrangements of photocells 14 in registration with the code tracks, and suitable sources 16 (FIG. 2) of illumination for the code tracks. Ordinarily, the disk is composed of glass and the track is provided by silver halide photography in terms of silvered and clear regions of a gelatin stratum. Such details are described, for example, in U.S. Patent No. 3,187,187, issued June 1, 1965, in the name of Sidney A. Wingate, for Shaft Encoder. As shown in FIG. 2, a pair of photocells 14 are spaced along the first, or outermost code track, of disk 10 from each other by 90° in terms of a single opaque increment, clear increment cycle. Each of these photocells receives illumination through a series of slits 18 on the photocell surface (FIG. 2) which present a sequence of blocking and transmitting increments of substantially the same dimensions as the opaque and clear increments of the code track for the purpose of transmitting optimum light flux while maintaining maximum optical resolution. Photocells 14 produce a pair of analog position signals of the form $E = E_m \sin 2\pi n\theta$ and $-E = E_m \cos 2\pi n\theta$, where E is instantaneous amplitude, $E_m$ is maximum amplitude, $1/\pi$ is period duration and $\theta$ is instantaneous angular displacement. These wave forms are shown in FIG. 3(a) and (b). For purposes to be explained in detail below, in the illustrated embodiments, the photocell arrangements for the second, third and remaining tracks incorporate a single photocell for each single code track. The photocell arrangement associated with any single code track applies its output essentially to a single channel to provide, in combination with outputs of the remaining photocells through other channels, a composite representatiton of the angular position of disk 10. The channel for the first code track is described in detail below. The channels for the remaining code tracks, which are conventional in themselves, are shown at 22.

The channel for the first code track generally includes a transfer component 24 for presenting sinuosoidally variable signals for useful magnitude to the remainder of the channel, a summing component 26 for producing a sequence of thirty-two sinuosoidally variable signals therefrom, a switching component 28 for sampling the signals from summing component 26 in sequence, a detecting component 32 for determining where in the sequence of sinuosoidally variable signals crossover from one polarity to the other occurs, and a counting circuit 30 for indicating the number of wave forms detected before the occurence of crossover, as a representation of angular position. The sequence of sinuosoidally variable signals is shown in FIG. 3(c).

Transfer component 24 includes a pair of amplifiers 38, 40 which receive the two sinuosoidally variable signals from photocells 14. The output of amplifier 38 and the output of amplifier 40 are applied to summing component 26, which includes a plurality of pairs of resistors 42, 44 each one of which pair being to provide a sinuosoidally variable signal that is somewhat spaced in phase from the reference input and from the sinuosoidally variable outputs of the other pairs. It will be appreciated that the total number of signals in the sequence is one-half of the number of subdivisions in each cycle of the code track because each crossover point (positive to negative or negative to positive) represents one such subdivision. The different signals, in effect, are produced by adding sine and cosine waves of different amplitudes. In the present case, these are sixteen different signals so that each cycle is divided into thirty-two subdivisions.

Counting component 30 sequences the operation of switching component 28 in such a way that the signals appearing across pairs of resistors 42, 44 are applied in sequence to detecting component 32. Counting component 30 is a ring counter having a sequence of flip-flops 48, for example magnetic cores, arranged in such a way that an input sequence of pulses from a clock pulse generator 50 may be registered therein. The sequence of clock pulses is shown in FIG. 5(a). In conventional fashion, adjacent flip-flops 48 are connected or electronically associated as at 52, the last flip-flop being connected by a lead 54 to the first flip-flop. The outputs of the first two of these flip-flops is shown in FIGS. 5(b) and (c) as illustrative of the outputs of all of these flip-flops. The instantaneous states of flip-flops 48, which are indicated at 56, provide control signals as at 57 for switching component 28.

Switching component 28 includes a logic circuit 59 and a sequence of gates 61 controlled thereby. As shown, logic circuit 59 is a diode matrix having associated flip-flops 61 to which the outputs of the ring counter are applied. The outputs of these flip-flops are applied through magnetic amplifiers 63. In conventional fashion the magnetic amplifiers drive the output through diodes 65, which are indicated by the small D-shaped symbols. Each of gates 67 includes a transistor 69 which transmits its associated sinuosoidally variable signal or not depending on its base state.

The sequential signals from gates 67, as shown in FIG. 4, are applied to detecting component 32, which includes a so-called squaring amplifier 58. Squaring amplifier 58 is a very high gain, push-pull arrangement of two transistors 71, 73, biased at 75 and cross coupled at 77, its two state output being determined by whether the input wave form is positive or negative as shown in FIGURE 6.

As shown, a flip-flop 76 is provided in order to determine which halves of the wave forms applied at 34 and 36 are being examined at any particular time. Flip-flop 76, in effect, inverts the negative portions of the wave forms so that a series of positive pulses are always examined initially i.e., as an indication of whether or not the wave form is to the left or to the right of the zero cross over point. The reason for this requirement is that there are two cross-over points for each cycle of each sinusoidally variable signal. The operation is such that with the aid of flip-flop 76, a series of pulses of predetermined polarity (in this case positive) always is sequentially examined. A switch 78 is energized when this series of pulses changes in polarity as a result of the input to squaring amplifier 58. Such a change in polarity is applied to a reset circuit 80 to stop operation of counting circuit 30, which then indicates the precise angular position to the encoder disk.

In considering the information provided by the first track, it is apparent that although a particular portion of a single incremental cycle (a single adjacent opaque increment, clear increment) is designated, the identity of no particular one of the multiplicity of incremental cycles in the first code track is designated. Assuming in the present case, a 20 digit output, having established the five least significant digits as above, fifteen additional tracks in natural binary code are utilized. It will be remembered that a property of natural binary code is that whenever a change in a more significant digit occurs, it is accompanied by a change in a less significant digit. Stated generally, when several digital indications are designed to change at any given time in logic circuitry, the preparation of this circuitry requires that they do change at that given time or that some corresponding or carryover logic circuitry be provided to obviate any unintended change. In other words, since it is impossible to provide code tracks in which, as a practical matter, exact coincidence of leading and lagging edges exists, appropriate carryover logic circuitry is required. Such logic circuitry is not discussed in detail since it is not a part of the present invention. However, each track is associated with a single photocell and slit arrangement, corresponding to one half of the unit shown in FIG. 2. Any particular shaft angle produces a "zero" or a "one" natural binary output. The inner tracks are such that, in the case of each adjacent pair of code tracks, the outer code track has twice as many incremental cycles as the inner code track and a transition (from clear to opaque increment or visa versa) in an inner code track necessarily is accompanied by a transition in the outer code track. However, the outermost track may have a number of cycles that is $2^n$ lines the number of cycles in the next to outermost track. The arrangement is such that any transition on an inner track is made to be coincident with a corresponding transition in the outermost code track. Also, the number of cycles in the next-outermost or second code track is ½ (or some other arbitrary fraction) the number of cycles of the first code track. Generally, the number of cycles in the first track, for a natural binary output of the foregoing kind, is $2^n$, a practical number being $2'^5$ for a code disk of from 5 to 10 inches in diameter.

The present invention provides several advantages of which the following are among the most significant. The accuracy of the readout in accordance with the present invention depends only on the outer track so that corresponding accuracy of the other tracks is not required. Also because analysis of the outer track is conducted in sequence, duplication of electronic components is minimized. The present invention thus provides a novel direct reading disk encoder for unprecedented accuracy, versatility and efficacy. Since certain changes may be made in the foregoing invention without departing from the scope of the invention herein involved, it is intended that all matter contained in the foregoing description or shown in the accompanying drawings shall be interpreted in an illustrative and not in a limiting sense.

What is claimed is:
1. An encoder comprising:
    a coded element with at least one code track, said track having a plurality of alternating regions thereon;
    means constrained for relative motion along said track, for sensing the relative position of said track and said means, and for producing at least a pair of signals representative of said position;
    means for combining said pair of signals in a pre- determined plurality of different relationships and producing a like plurality of signals;

means for detecting a predetermined change in said combined signals;

means for sequentially generating a plurality of signals and for sequentially applying said combined signals to said detector means;

means for reading out one of said sequentially generated signals when said predetermined change is detected.

2. The encoder of claim 1 wherein said combined signals differ one from another in phase relationship.

3. The encoder of claim 1 wherein said sequentially generating means generates a plurality of digital signals.

4. The encoder of claim 3 wherein said sequentially generating means includes a binary ring counter.

5. The encoder of claim 4 wherein the sequential means further includes gating means enabled by signals from said binary counter, said gating means connected between said combining means and said detecting means.

6. The encoder of claim 5 wherein the combining means is a weighted resistor network.

7. The encoder of claim 6 further including a squaring amplifier connected between said detecting means and said gating means.

8. The encoder of claim 1 wherein said coded element is a code disc.

9. The encoder of claim 1 wherein said plurality of alternating regions are alternatively opaque and transparent, said constrained means is a pair of electro-optical transducers and said encoder further including means for directing radiation through said code track to said transducers.

10. The encoder of claim 9 wherein said photosensitive devices are arranged such that the output signals therefrom are phase displaced from one another by 90° electrically.

11. An optical shaft angle encoder comprising:

a coded disc with at least one code track, said track having a plurality of alternating opaque and transparent regions;

means for directing radiation through said code track;

a pair of electro-optical transducers constrained for relative motion along said track for sensing the relative position of said track and said transducer by sensing the radiation emanating therethrough and producing a pair of electrical signals phase displaced from one another by 90°;

a network including a plurality of resistors in predetermined weighted relationship and arranged in pairs connected in a wye configuration;

means for transmitting the signal from one of said pairs of transducers to one input terminal of each of said pair of wye connected resistors and means for connecting the other of said transducers output signals to the other input terminal of said pairs of resistors;

a like plurality of gating networks each of which is connected to the output terminal of one of said pairs of resistors;

a clock pulse generator;

a binary ring counter connected to said clock pulse generator and having parallel output terminals;

a commutating matrix, the input of which is connected to said counter output and the output terminals of which are connected to one input terminal of said gating networks;

means for detecting a change in sign of the singals from the gating networks; and means for reading the output of said binary counter upon the detection of said sign change.

References Cited

UNITED STATES PATENTS 3,303,347    2/1967    Wingate _____ 210—231

RALPH G. NILSON, *Primary Examiner.*

M. ABRAMSON, *Assistant Examiner.*